INVENTORS
ROY N. OLSON
PAUL H. FREY

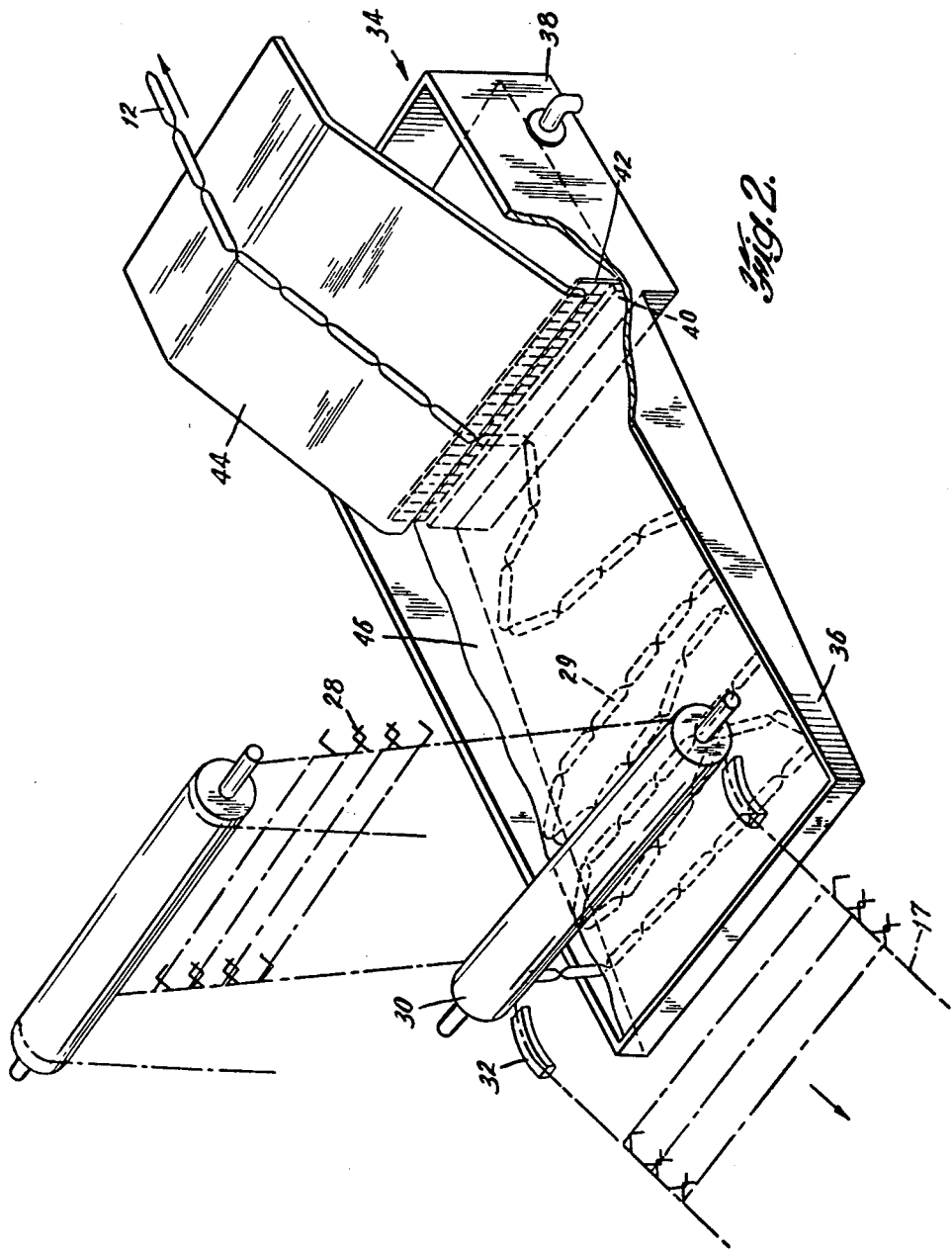

United States Patent Office

3,494,277
Patented Feb. 10, 1970

3,494,277
STRAND UNLOADER
Roy N. Olson, Palos Heights, and Paul H. Frey, La Grange, Ill., assignors to Union Carbide Corporation, a corporation of New York
Application Oct. 24, 1966, Ser. No. 588,912, now Patent No. 3,408,205, dated Oct. 29, 1968, which is a continuation-in-part of application Ser. No. 342,512, Feb. 4, 1964. Divided and this application Dec. 1, 1967, Ser. No. 701,508
Int. Cl. A22c 11/00; A23b 1/00
U.S. Cl. 99—355                                   8 Claims

ABSTRACT OF THE DISCLOSURE

A flotation tank is provided and adapted to contain a liquid bath into which batches of strands of continuous strings of linked frankfurters are dumped and then advanced to the input end of a casing-peeling machine by means of the liquid bath.

---

Figure 1:
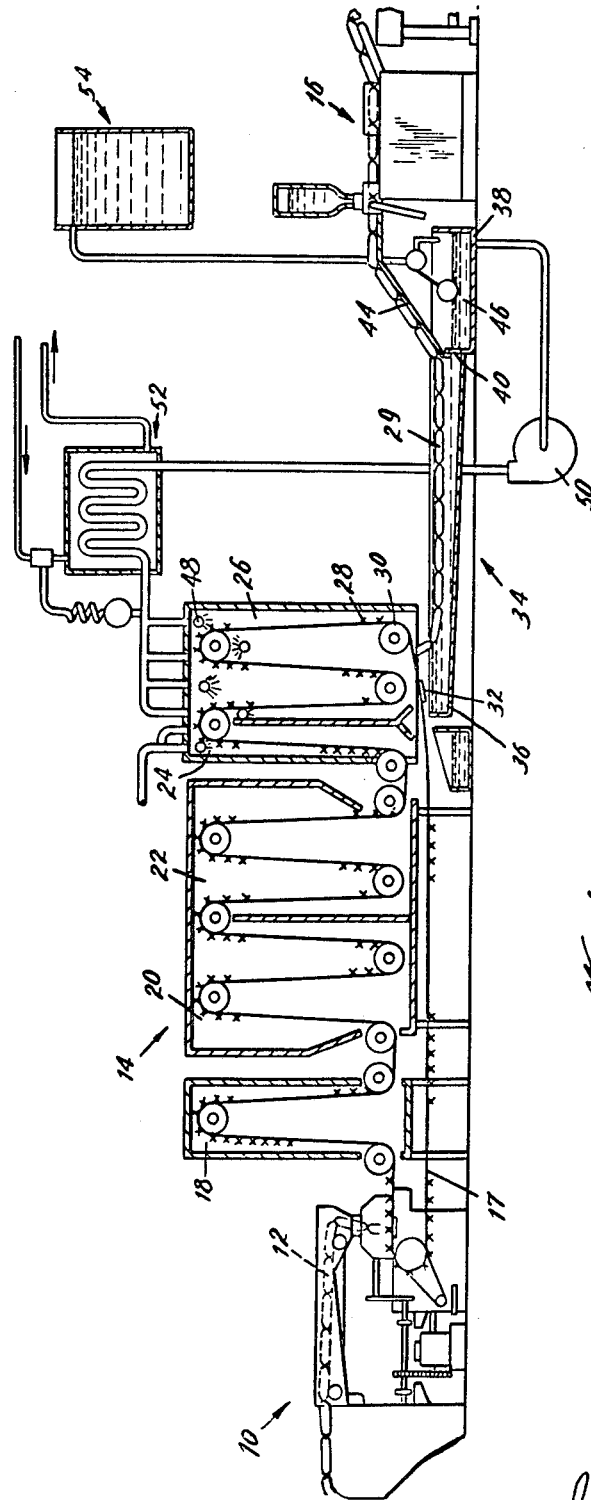

The present application is a divisional application of application Ser. No. 588,912, filed Oct. 24, 1966 and which issued as Patent No. 3,408,205 on Oct. 29, 1968. Application Ser. No. 588,912 is a continuation-in-part application of application Ser. No. 342,512, filed Feb. 4, 1964, now abandoned.

The present inveniton relates to an apparatus for use in unloading continuous strands of frankfurters. More particularly, the present invention relates to an apparatus into which continuous strands of frankfurters are deposited, aligned and conveyed to automatic peeling apparatus. The apparatus of the present invention is useful in conjunction with cooking chambers in which continuous strands of frankfurters are cooked and processed, particularly those cooking chambers that are equipped with terminal cooling chambers.

The present invention is an improvement upon the patent to Tauber et al. (3,125,017) issued Mar. 17, 1964, and the patent to Kugler et al. (3,223,531) issued Dec. 14, 1965. These patents disclose apparatus in which a string of frankfurters is metered and distributed onto a continuously advancing basket conveyor through cooking chambers in the time necessary to cook the product in an environment of high velocity heated gas, such as air or wood smoke, circulated through the chambers by a blower, after which the product is advanced into and through a chilling or cooking unit.

In the cooking chambers, an encased frankfurter string is loaded into a succession of advancing, tandem mounted, transversely extending baskets comprising the cooker conveyor. The frankfurter string is conveyed thereby successively upwardly and downwardly as the conveyor baskets are advanced through smoking, cooking and cooling chambers. The baskets are inverted as the conveyor chains pass about a pair of sprockets and engage stationary shoes guiding the return flight of the conveyor to the loading station. As the successive strands of frankfurter string exit from the cooker-cooling chamber, they are irregularly dumped from the baskets in batches of serpentine strands and drop back and forth across the open bottom of the cooling chamber.

The problem to be overcome was to advance a string of linked frankfurters continuosly discharged from a cooker-cooling chamber and to slack feed the string to one or more commercial casing peeling machines.

Various methods and means were contemplated during the development of the cooker to handle the dumped batches of frankfurters in a simple manner and convey the string of frankfurters from the dumping station to a commercial peeling machine. These methods and means did not prove satisfactory because the conveying means utilized were complex and/or were considered unsanitary and were not trouble-free. Since conventional casing peeling machines can be intermittently or continuously operated and are generally adapted to accept the string of franfurters in a straightened or aligned condition. it was found that the conveying means generally utilized in cooperation with these peeling machines did not provide for a sufficient accumulation of strands of frankfurters (hereinafter and in the appended claims referred to as "in-process inventory") to permit the continuous operation of the cooker unit and compensate for normal variations in peeling speed, or interruptions in the peeling operation when desired or required for machine adjustments, cleaning and the like.

Furthermore, such designs did not positively prevent the string from being tangled or snarled at the input end of the peeling machines. It was found that if the strand was indiscriminately discharged into a pile, the weight of the frankfurters on top would cause the lower part of the pile to become tangled. Additionally, the string of chilled frankfurters would warm to ambient temperature and the frankfurters would lose moisture while being conveyed to the peeling machine.

It is an object of the present invention, therefore, to provide an apparatus for unloading continuous strands of frankfurters, unscrambling and aligning them, and advancing them to conventional peeling machines while maintaining the product at a desired temperature and salinity.

A further object of the present invention is to provide an improved apparatus for receiving the discharge of transversely oriented, serpentine strands of a string of frankfurters dumped from a cooker conveyor and gently separating and unscrambling the accumulated strands from each other by flotation, and advancing the string to a casing peeling machine.

A further object is to provide improved apparatus for unloading and unscrambling strands of frankfurters dumped from transversely extending baskets of a conveyor into an elongated pool of liquid adapted to move and float the frankfurters while maintaining their temperature and salinity. The elongated pool of moving liquid provides a reservoir means for floating an in-process inventory of accumulated frankfurters and for gently unscrambling the strands of the product and advancing and slack-feeding the string of frankfurters to one or more spaced, continously-operating peeling machines.

According to the present invention, there is provided a liquid reservoir means adapted to accept batches of transverse strands of a continuous string of encased, linked frankfurters dumped therein; and means to float the strands and advance the string to the input end of a casing peeling machine while maintaining the temperature and salinity of the frankfurters after they have been discharged from a cooling chamber of the cooker.

In the present invention, a string of frankfurters is advanced by flotation in a bath to provide an accumulated quantity of continuous strand product; that is, an in-process inventory, between a uniform rate of supply at the discharge end of a cooker-cooling chamber and a non-uniform rate of withdrawl to conventional peeling apparatus; further cooling the product in the flotation bath and maintaining the product at a predetermined temperature; and concomitantly controlling the salt content of the product.

It has been found that the string of frankfurters may float in a bath of controlled salinity at a level intermediate the bottom of the tank and the surface of the liquid, the level of flotation of the production varying according to the relative specific gravities of bath liquid and of the encased cooked frankfurters. The specific gravity of the bath can, of course, be varied by adjusting the salinity of the liquid and can thusly be concomitantly controlled to lower the temperature of the frankfurters and minimize leaching of salts from the frankfurters.

However, it should be understood that the salinity of the bath should be adjusted so that its specific gravity will be greater than the specific gravity of the frankfurters, thus insuring that the frankfurters will have some degree of buoyancy enabling them to float in the liquid bath. It should be further understood that where the liquid bath is also desired to be utilized to prevent or minimize leaching of the salts from those frankfurters which are treated with salts for flavoring and the like, the salt concentration of the liquid bath should be at least equal to the salt concentration of the salt-treated frankfurters.

The manner in which and the degree to which the liquid bath should be treated to obtain a desired or required specific gravity and/or salt concentration will, of course, be dependent upon the nature, composition and salt content of the frankfurters and can be readily derived or obtained by those skilled in the art.

The present invention will become more clear when considered together with the accompanying drawing, which is set forth as being illustrative and not intended, in any way, to be limitative thereof, and wherein:

FIGURE 1 is a diagrammatic elevational view, partly in section, of a frankfurter cooker unit showing the feeder unit, cooking chambers, unloader unit and peeling machine; and FIGURE 2 is a diagrammatic perspective view, part broken away and part in phantom of the flotation tank, a portion of the frankfurter conveyor and the guide to the peeling machine.

Turning now to the drawing wherein like reference numerals denote like parts, there is shown the frankfurter cooker unit comprised of a feeder device, shown generally by reference numeral 10, that feeds a continuous string of encased linked frankfurters 12 to a cooker shown generally by reference numeral 14. Feeder device 10 is disclosed in the patent to Kugler et al. (3,223,531) and the cooker 14 is disclosed in the patent to Tauber et al. (3,125,017) each of which has been identified hereinabove.

The cooker 14 is positioned in tandem with feeder 10 and is connected thereto by basket conveyor 17 that is continuously driven from feeder 10 and is advanced to pass successively upwardly and downwardly about sprockets through a smoke chamber 18, a first cooking chamber 20 and a second cooking chamber 22, a first water spray cooling chamber 24 and a second water spray cooling chamber 26.

Feeder 10 meters and distributes frankfurter string 12 into the baskets of conveyor 17 in a transverse undulating pattern comprising strands 29 that are thus conveyed through the smoking, cooking and cooling chambers.

The baskets 28 are inverted as the advancing conveyor chains 17 pass about the terminal sprockets 30 and engage stationary shoes 32 guiding the return flight of the conveyor to the feeder unit 10. As the baskets 28 of conveyor 17 are inverted at the terminal or dump station, the successive strands of the frankfurters 29 are irregularly dumped from each successive basket 28 through the open bottom of cooler chamber 26 as a randomly ordered, transversely undulating, string of frankfurters into a shallow flotation tank, generally indicated by reference numeral 34, containing a moving liquid bath solution 46.

The open top flotation tank 34 has a shallow portion at its fore end 36 and a bottom which slopes downwardly aft toward an open top sump 38 separated from fore end 36 by a weir 40. The weir 40 is of predetermined height in order to maintain the liquid 46 at a desired level at the fore end 36 of the tank and also has a screen 42 secured to its top edge which supports the lower end of an inclined plate 44. Screen 42 also acts to prevent the frankfurter strands 29 from flowing over weir 40 into sump 38 while inclined plate 44 acts to guide the straightened and aligned string of frankfurters 12 to a commercial peeling apparatus 16.

The frankfurter strands 29 are continuously floated away from the dump station by movement of the liquid bath solution 46 falling from the cooling spray chamber 26 and advancing toward weir 40. In this manner, successive serpentine strands of the frankfurter string are floated out of the path of succeeding strands dropped into tank 34 and are advanced by the moving solution to the submerged lower edge of inclined plate 44. The frankfurter strands 29 are then drawn up out of the liquid bath in the flotation tank to a commercial peeler machine 16 by the input feed means of the frankfurter casing peeling machine where the casing is subsequently removed.

When the commercial peeling machine 16 is intermittantly operated or periodically stopped for cleaning or adjustment, it is not necessary to also stop the frankfurter string 12 from advancing through the cooking and cooling chamber 14 and being deposited in the flotation tank 34. Thus, a previously cooked and cooled string of frankfurters 12 can continue to be dumped into and deposited in the flotation tank 34 and permitted to accumulate therein as an in-process inventory of frankfurter strands 29 until the commercial peeling machine 16 is started up again. Meanwhile, the dumped, serpentine frankfurter strands 29 will become unsnarled and gently untangled by the movement of the liquid bath in the flotation tank 34 and will be permitted to freely and loosely float therein until straightened and aligned and withdrawn from the flotation tank 34 over inclined plate 44 to a commercial peeling machine 16.

The liquid bath is generally a salt or brine solution 46 and can be circulated, replenished and cooled in the following manner: The solution in the sump 38 of tank 34 flows therefrom to a pump 50 where it is pumed to a heat exchanger 52. Solution 46 is chilled in heat exchanger 52 to about 30° F. and flows to header pipes secured to cooler chamber 26 where it is discharged through appropriate spray nozzles 48 positioned to spray solution 46 against the product strands 29 contained in the advancing conveyor baskets. Solution 46 drains from the frankfurter strands supported in baskets 28 and is collected in the fore portion 36 of the underlying flotation tank. Solution 46 flows over the top of weir 40 to the sump 38 from which it is again drawn by suction means (not shown) to pump 50 and thence recirculated in a similar manner to the spray nozzles 48. Makeup solution for replenishing and maintaining the salinity of solution 46 can be supplied to the sump through a float valve by gravity from a concentrated brine or salt solution supply shown generally by reference numeral 54. It should be noted that in this embodiment the cooling liquid for cooling chamber 24 is supplied by other means separate and apart from the liquid supplied to cooling chamber 26.

In starting the operation, an advance end of the frankfurter string 12 is pulled to the aft end of tank 34 and is drawn up the inclined plate 44 to the input end of the peeler machine. The inclined plate 44 guides the string of frankfurters to the peeler machine and allows excess solution 46 to drain from the product before being drawn into the peeler machine.

The length of the frankfurter string 12 floating in solution 46 as loose, freely floating serpentine strands 29 can be utilized to provide a desired or required in-process inventory. The fore end 36 of the tank is made slightly wider than cooler chamber 26 can be made of a length to accommodate a required or desired in-process inventory of accumulated product.

As an example, but not by way of limitation, the cooker can be operated at a frankfurter string speed of about 40 to 60 feet per minute and a typical unloader flotation tank to be used therewith can be about seven feet wide and have a sloping fore portion about seven feet long and a sump portion about three feet long. Such a flotation tank can easily handle an in-process inventory of accumulated frankfurters of about 300 feet and contain a liquid bath maintained at a temperature sufficient to reduce the internal temperature of the in-process inventory of frankfurters to about 40° F. at the input end of the peeler machine 16. These conditions comply with common packing house operating practice used in making and processing frankfurters.

In the first spray chamber 24, tap water is used at a temperature of about 50° F. to initially spray and cool the frankfurters advancing in the baskets 28 from cooking chamber 22. The liquid used in the second spray chamber 26 is at a temperature of about 28° to 30° F., to spray and further cool the frankfurters in baskets 28 and is collected in the flotation tank 34 to continue the cooling of the frankfurters 12 dumped from the baskets as the string of frankfurters 29 is advanced toward the peeler.

The frankfurters can thus be cooled to the desired or required internal temperature in about 10 to 12 minutes after leaving the cooking chamber. A suitable liquid bath solution, such as a common salt solution having a specific gravity of about 1.05, can be used to prevent freezing at the operating temperature, and this solution can concomitantly serve to minimize leaching of salts used in those meat emulsions to flavor and preserve the frankfurters.

The apparatus of the present invention has several advantages in that the flotation tank system is simple and economical to fabricate, the system can be readily cleaned and maintained in a sanitary condition, and the flotation tank can be of any length (intermediate the dump station and the peeler trough) to provide the required or desired in-process product inventory.

Furthermore, the composition of the liquid bath employed in the flotation tank can be varied or adjusted as desired or required and serve to initially cool the frankfurters in the baskets moving through the second cooler chamber and then be drained to the flotation tank to continue the cooling of the string of frankfurters and advance them by floating them in the flotation tank. Also, the residence time of the frankfurters comprising the product in-process inventory provides a more uniform temperature throughout the frankfurter meat mass during the time the string is advanced to the peeler machine.

What is claimed is:
1. In an apparatus for processing frankfurters comprising, in combination;
    (a) means for advancing a continuous string of frankfurters onto a conveyor in an undulate pattern of frankfurter strands; and
    (b) means for advancing said undulate pattern of frankfurter strands on said conveyor through cooking and cooling means comprising a plurality of cooking and cooling chambers and thence to commercial peeling apparatus,
the improvement comprising, in combination:
    (c) a flotation tank adapted to contain a liquid bath solution, said flotation tank being positioned intermediate the outlet end of said cooking and cooling means and the input end of said peeling apparatus;
    (d) means for discharging said undulate pattern of frankfurter strands from the conveyor of and at the outlet end of said cooking and cooling means into one end of said flotation tank;
    (e) means for causing the liquid bath solution in said flotation tank to flow such that said frankfurter strands are transported toward the input end of said peeling apparatus and the undulate pattern in said discharged frankfurter strands tends to become straightened; and,
    (f) means at the other end of said flotation tank for guiding the straightened frankfurter strand from the flotation tank to the input end of said peeling apparatus.

2. The apparatus of claim 1 wherein the flotation tank is shallower at the end adjacent the output end of said cooking and cooling means.

3. The apparatus of claim 1 wherein the flotation tank is equipped with means to circulate said liquid bath solution to and from a replenishing source.

4. The apparatus of claim 3 wherein said circulating means includes means to recirculate and discharge said liquid bath solution into the last cooking chamber of said cooking and cooling means.

5. The apparatus of claim 1 wherein said flotation tank is provided with means to prevent said straightened frankfurter strand from being transported beyond the point at which they are guided to the input end of said peeling apparatus.

6. In an apparatus for processing frankfurters comprising, in combination;
    (a) means for advancing a continuous string of frankfurters onto a conveyor in an undulate pattern of frankfurter strands; and,
    (b) means for advancing said undulate pattern of frankfurter strands on said conveyor through processing means comprising a plurality of cooking and cooling chambers and thence to commercial peeling apparatus,
the improvement comprising, in combination;
    (c) a flotation tank adapted to contain a liquid bath solution therein and positioned intermediate the outlet end of said cooking and cooling chambers and the input end of said casing peeling apparatus, the end of said flotation tank adjacent the outlet end of said cooking and cooling chambers being shallower than the other end of said flotation tank;
    (d) means for discharging said undulate pattern of frankfurter strands from said conveyor at the outlet end of said cooking and cooling chambers into said flotation tank;
    (e) means for circulating the liquid bath solution in said flotation tank through said flotation tank and to and from a replenishing source such that said frankfurter strands are transported by said liquid bath solution in said flotation tank from the shallow end thereof toward the other end of said flotation tank causing the undulate pattern in said discharged frankfurter strands to become straightened;
    (f) guide means at the other end of said flotation tank for guiding the straightened frankfurter strands from said floation tank to the input end of said casing peeling machine; and
    (g) means at said other end of said flotation tank for preventing said straightened frankfurter strand from being transported beyond said guide means.

7. The apparatus of claim 6 wherein said circulating means includes means to circulate and discharge said liquid bath solution into the last cooking chamber comprising said cooking and cooling chambers.

8. The apparatus of claim 6 wherein said liquid bath solution has a specific gravity greater than the specific gravity of said frankfurter strands.

References Cited

UNITED STATES PATENTS

| | | | |
|---|---|---|---|
| 2,630,598 | 3/1953 | Grey | 17—1 |
| 2,689,971 | 9/1954 | Grey | 17—1 |
| 3,121,638 | 2/1964 | Tauber et al. | 99—109 |
| 3,204,844 | 9/1965 | Wallace | 99—109 XR |
| 3,223,531 | 12/1965 | Kugler et al. | 99—109 |
| 3,276,352 | 10/1966 | Allen et al. | 99—443 |

BILLY J. WILHITE, Primary Examiner

U.S. Cl. X.R.

17—1; 99—443